United States Patent
Aitken et al.

(10) Patent No.: US 6,555,232 B1
(45) Date of Patent: Apr. 29, 2003

(54) HIGH STRAIN POINT GLASSES

(75) Inventors: Bruce G. Aitken, Corning, NY (US); Adam J. G. Ellison, Corning, NY (US); Thomas E. Paulson, Corning, NY (US)

(73) Assignee: Corning, Incorporated, Corning, NY (US)

( * ) Notice: Subject to any disclaimer, the term of this patent is extended or adjusted under 35 U.S.C. 154(b) by 0 days.

(21) Appl. No.: 09/997,052

(22) Filed: Nov. 28, 2001

(51) Int. Cl.⁷ .......................... B32B 17/06; C03C 3/095
(52) U.S. Cl. ...................... 428/428; 501/152; 501/63; 501/64
(58) Field of Search ................ 501/152, 63, 64

(56) References Cited

U.S. PATENT DOCUMENTS

| | | | |
|---|---|---|---|
| 2,444,845 A | 7/1948 | Perley | 204/195 |
| 2,805,166 A | 9/1957 | Löffler | 106/47 |
| 3,022,182 A | 2/1962 | Cleek et al. | 106/52 |
| 4,302,250 A | 11/1981 | Danielson | 501/70 |
| 5,374,595 A | 12/1994 | Dumbaugh, Jr. et al. | 501/66 |
| 5,827,790 A * | 10/1998 | Evans et al. | 501/66 |
| 6,060,168 A * | 5/2000 | Kohli | 428/428 |
| 6,319,867 B1 | 11/2001 | Chacon et al. | 501/66 |
| 6,374,641 B1 * | 4/2002 | Chu et al. | 65/385 |

FOREIGN PATENT DOCUMENTS

WO    WO 00/32528    6/2000    .......... C03C/3/091

* cited by examiner

Primary Examiner—Deborah Jones
Assistant Examiner—G. A. Blackwell-Rudasill
(74) Attorney, Agent, or Firm—Milton M. Peterson; Scott S. Servilla

(57) ABSTRACT

A family of titania lanthana aluminosilicate glasses, and products such as an electronic device having a poly-silicon coating on such glass as a substrate, are disclosed. The glasses have a strain point in excess of 780° C., a coefficient of thermal expansion of $20-60\times10^{-7}/°$ C., a Young's modulus of greater than 12 Mpsi and are chemically durable.

14 Claims, No Drawings

HIGH STRAIN POINT GLASSES

FIELD OF THE INVENTION

The invention relates to $(TiO_2, Ta_2O_5)$—$La_2O_3$—$Al_2O_3$—$SiO_2$ glasses that are characterized by a high strain point, a low coefficient of thermal expansion and a capability of being produced as sheet glass by conventional methods.

BACKGROUND OF THE INVENTION

Glass substrates for electronic devices have been limited to use and processing temperatures not over about 600–650° C. For higher temperatures, the only available transparent materials have been fused silica or a class of glass-ceramics. These materials are difficult, and therefore expensive, to produce.

Fused silica provides a high strain point (typically>1000° C.) and excellent thermal stability. However, it is difficult to produce and fabricate. Also, it has a low ($5 \times 10^{-7}/°$ C.) coefficient of thermal expansion (CTE) that is not compatible with such electronic materials as silicon.

Transparent, spinel glass-ceramics also provide high strain points (typically>900° C.), and provide a better expansion match with silicon ($25–40 \times 10^{-7}/°$ C.). However, ceramming these materials adds to their cost. Also, their predecessor glasses tend to be very fluid at their liquidus temperatures. This poses a challenge to forming precision sheet glass; as well as other glass forms.

A need exists, then, for a glass that (1) has a high strain point (>780° C.), (2) does not require costly heat treatments after fabrication, (3) that can be formed at a viscosity greater than $10^3$ poises, and (4) can be melted in a conventional melting unit. In addition, the glass must be transparent to visible radiation and be chemically durable. These several qualities are needed in glasses for production of such varied products as flat panel displays, photovoltaic cells, and tubing and fiber applications that require stability at high temperatures.

Flat panel displays employ sheet glass that necessarily is transparent at visible wavelengths as well as into the ultra violet. It is also necessary that the glass sheet be adapted to production of a silicon layer on the glass surface. Initially, the silicon layer applied was amorphous silicon (a-Si). Fabrication of such devices required temperatures no greater than 350° C. Suitable glasses were readily available for use under these conditions.

The evolution from a-Si to poly-Si (polycrystalline silicon) as a coating material has presented a major challenge to use of a glass substrate. Poly-Si coatings require much higher processing temperatures, in the range of 600–1000° C.

One available substrate material is fused silica. This material has a high strain point of about 1000° C. and excellent thermal stability. However, it has a low CTE that is markedly lower than poly-Si. Furthermore, the ability to fabricate this material is limited, and, at best, very expensive.

Another potential candidate is a family of transparent, spinel glass-ceramics. These materials have the required high strain point of >780° C. They are also reasonably well matched to poly-Si in CTE. However, the additional ceramming process adds significantly to the cost of production. Perhaps more important is the fact that the precursor glasses of these glass-ceramics are very fluid at their liquidus temperatures. This presents a serious challenge to formation of precision sheet glass.

Glasses available from Corning Incorporated under Codes 1737 and 2000 can be used for some low temperature applications on the order of 600–650° C. This glass is an aluminosilicate glass that contains a mixture of divalent metal oxides and is essentially free of alkali metal oxides. Even this glass must be subjected to special thermal treatment to avoid shrinkage or compaction during poly-Si deposition.

The efficient production of high quality, poly-Si, thin films requires thermal annealing at temperatures in the 800–900° C. range. This higher temperature anneal enables shortening the annealing time. It also results in excellent uniformity at the coating-substrate interface, and more stable performance of a device over time. Except for the fused silica and glass-ceramic substrates mentioned above, there has not been a suitable, substrate material available.

A primary purpose of the present invention is to provide a glass that has properties suited to production of a poly-Si coating on its surface.

Another purpose is to produce a glass having a sufficiently high strain point to permit processing at 800–900° C.

A further purpose is to provide a glass that can be melted and formed by conventional procedures employed in producing sheet glass, and that can provide a substrate for application of a high quality, poly-Si film.

A still further purpose is to provide an electronic device, in particular, a flat panel display, embodying a sheet glass substrate, produced in a conventional manner, and having a high-quality, poly-Si, thin film on its surface.

Another purpose is to provide a novel glass family consisting essentially of ($TiO_2$ and/or $Ta_2O_5$), $La_2O_3$, $Al_2O_3$ and $SiO_2$, and optionally containing selected oxides including $Y_2O_3$, $ZrO_2$, $HfO_2$, $SnO_2$, $GeO_2$, $Ga_2O_3$, $Sb_2O_3$, $B_2O_3$ and/or $P_2O_5$.

SUMMARY OF THE INVENTION

The invention resides in part in a family of titania lanthana aluminosilicate glasses having a strain point in excess of 780° C., a coefficient of thermal expansion of $20–60 \times 10^{-7}/°$ C., a Young's modulus greater than $8.28 \times 10^4$ MPa (12 Mpsi), and a weight loss of less than one $mg/cm^2$ in BHF (buffered HF). Titania, or equivalently tantalum oxide, is an essential constituent which serves to lower the CTE of the glass to a value compatible with poly-silicon. These oxides also act as fluxes, steepen the viscosity curve, and increase strain point.

The invention further resides in an electronic device having a poly-silicon film on a transparent, glass substrate, the substrate being a titania lanthana aluminosilicate glass having a strain point in excess of 780° C., a coefficient of thermal expansion of $20–60 \times 10^{-7}/°$ C., a Young's modulus greater than $8.28 \times 10^4$ MPa (12 Mpsi), and a loss of less than one $mg/cm^2$ in BHF.

DESCRIPTION OF THE INVENTION

This invention is based on our discovery of a family of titania lanthana is aluminosilicate glasses. These glasses possess unique properties particularly suited to production of electronic devices having a film of poly-silicon on the glass surface. In particular, the glasses have a strain point in excess of 780° C. and a coefficient of thermal expansion (CTE) of $20–60 \times 10^{-7}/°$ C., preferably in the range of $20–40 \times 10^{-7}/°$ C. The glasses also have a high Young's modulus, greater than $8.28 \times 10^4$ MPa (12 mpsi), and are chemically durable, especially in buffered HF (BHF). The titania can be partially or completely replaced by tantalum oxide with no detrimental effects on CTE or strain point.

The buffered HF test determines the weight loss in mg/cm$^2$ and sample appearance of a glass sample after immersion in a buffered hydrofluoric acid solution for five (5) minutes. The solution consists of one volume of 50% by weight HF and ten volumes of 40% by weight ammonium fluoride (NH$_4$F). The solution is maintained at 30° C. for the test.

As pointed out earlier, there is an available commercial glass that can be melted in conventional manner and that can have a poly-silicon film deposited on the glass surface. To accomplish this requires special treatment of the glass, and the operation must be carried out at temperatures not over 650° C.

The efficient production of devices having a high quality poly-silicon film requires thermal annealing of the film at temperatures in the range of 800–900° C. However, a conventionally produced glass, capable of use at such temperatures, has not been available. The present invention provides such glasses.

The glasses of the present invention are members of a titania lanthana aluminosilicate (TiO$_2$—La$_2$O$_3$—Al$_2$O$_3$—SiO$_2$) glass family. They are characterized by a very high strain point (greater than 780° C.) and a CTE closely matching that of silicon (25–40×10$^{-7}$/° C.). As already stated, The titania can be partially or completely replaced by tantalum oxide with no detrimental effects on CTE or strain point.

Broadly stated, the present glasses have compositions falling within the following ranges, expressed in mole % as calculated from the glass batch on an oxide basis:

| | | | |
|---|---|---|---|
| SiO$_2$ | 40–90% | TiO$_2$ | 0–20% |
| Al$_2$O$_3$ | 5–35% | Ta$_2$O$_5$ | 0–10% |
| La$_2$O$_3$ | 2–30% | (TiO$_2$ + Ta$_2$O$_5$) | 0.5–20% |
| | | RO | 0–10% | where R is Mg, Ca, Sr, Ba and/or Zn. In the range of 40–60% SiO$_2$, lanthanum oxide can be partially or completely replaced by yttrium oxide, lowering the density and CTE while maintaining or even raising the strain point. Other optional constituents which are compatible with the inventive glasses include ZrO$_2$, HfO$_2$, SnO$_2$, GeO$_2$, and/or Ga$_2$O$_3$. Additions of up to 10% on a molar basis of each of these oxides and/or up to 3% on a molar basis of Sb$_2$O$_3$, WO$_3$, B$_2$O$_3$ and/or P$_2$O$_5$ can be made without lowering the strain point below 780° C. Beyond these levels, glasses either become unstable or their properties fall below that of the inventive glass compositions.

These glasses have the following characteristic properties:

| | |
|---|---|
| Strain Point | >780° C. |
| CTE | 20–60 × 10$^{-7}$/° C. |
| Young's modulus | >8.78 × 10$^4$ MPa |
| Durability in BHF | <1 mg/cm$^2$ |

A preferred embodiment has compositions within these ranges, again in mol % on an oxide basis, as calculated from the glass batch:

| | |
|---|---|
| SiO$_2$ | 70–84% |
| Al$_2$O$_3$ | 6–18% |
| La$_2$O$_3$ | 2–15% |
| TiO$_2$ | 0–8% |
| Ta$_2$O$_5$ | 0–8% |
| (TiO$_2$ + Ta$_2$O$_5$) | 0.5–10% |
| RO | <3% |

These preferred glasses are characterized by the following properties:

| | |
|---|---|
| Strain Point | 840–900° C. |
| CTE | 20–40 × 10$^{-7}$/° C. |
| Young's modulus | 8.78 × 10$^4$ MPa |
| Durability in BHF | ~0.5 mg/cm$^2$ weight loss |

Clear, single-phase glasses that were well-fined were obtained by melting 4.54 kg (ten lb.) crucible melts of compositions within the preferred ranges at a temperature of about 1650° C. for times not over 20 hours. It is essential that La$_2$O$_3$ be present in the indicated amount to obtain such melts; also that the total content of La$_2$O$_3$ plus TiO$_2$ and Ta$_2$O$_5$, if present, be not greater than the Al$_2$O$_3$. The presence of TiO$_2$ and/or Ta$_2$O$_5$ is necessary for a maximum strain point and a minimum CTE. Preferably, the contents are such that the ratio of La$_2$O$_3$ to TiO$_2$+Ta$_2$O$_5$ is between 1 and 4.

The position of the UV edge in glasses containing TiO$_2$ is controlled by including As$_2$O$_3$ or CeO$_2$ in the composition. The oxides buffer against reduction of Ti$^{+4}$ to Ti$^{+3}$. They also enhance fining, as does employing halides, e.g. AlCl$_3$, AlF$_3$, and/or AlBr$_3$, instead of oxides in the glass batch to be melted.

TABLE I, below, sets forth several compositions, in mol % on an oxide basis, illustrative of the invention. Also shown are characteristic properties as measured on the glass produced.

TABLE I

| Series | 882 | 882 | 889 | 882 | 889 | 889 | 889 | 889 | 889 |
|---|---|---|---|---|---|---|---|---|---|
| Code | COJ | COT | CWB | CVN | DAQ | DAT | CXZ | CXM | CVL |
| SiO$_2$ | 40 | 55 | 70 | 70 | 76 | 82 | 82 | 84 | 86 |
| Al$_2$O$_3$ | 30 | 15 | 18.8 | 17 | 15 | 11.25 | 12 | 10 | 8 |
| La$_2$O$_3$ | 25 | 25 | 5.6 | 13 | 4.5 | 3.4 | 4 | 5 | 5 |
| TiO$_2$ | 5 | | 5.6 | | 4.5 | 3.4 | 2 | | 1 |
| Ta$_2$O$_5$ | | 5 | | | | | | 1 | |
| Softening Pt. (° C.) | 956 | 984 | 1050 | 1015 | | | 1110 | | |
| Anneal Pt. (° C.) | 826 | 846 | 839 | | 910 | 939 | 948 | 928 | 958 |

TABLE I-continued

| Series | 882 | 882 | 889 | 882 | 889 | 889 | 889 | 889 | 889 |
|---|---|---|---|---|---|---|---|---|---|
| Strain Pt. (° C.) | 790 | 805 | 802 | | 834 | 862 | 882 | 854 | 880 |
| $CTE_{RT-300}$ ($\times 10^{-7}$/° C.) | 62.1 | 64.6 | 32.0 | 54 | 28.4 | 23.3 | 22.7 | 27.9 | 27.5 |
| Density (g/cm$_2$) | 4.26 | 4.65 | 2.91 | 3.4 | 2.78 | 2.64 | 2.68 | 2.76 | 2.73 |
| Young's modulus $\times 10^4$ MPa | | | | | 8.9 | 8.4 | | 8.35 | 8.2 |
| Durability (mg/cm$_2$) | | | 0.49 | | | | 0.5 | | |

The strain points are somewhat lower than fused silica or the spinel glass-ceramics. However, they are substantially higher than available, conventionally melted glasses, and quite adequate for their intended purpose. The slightly lower strain point is more than offset by the use of conventional melting and processing procedures and other favorable properties, such as matching expansion and favorable viscosity at the glass liquidus, thus, a glass having the composition of Example 7 in TABLE I, in addition to having a strain point of 882° C. and a CTE of 22.7×10$^{-7}$/° C., has a liquidus viscosity of 7000 poises.

It has been observed that a high ratio of $La_2O_3$ to $TiO_2$ provides greater glass stability during forming of glass by a down-draw process. For example, the glass of Example 4 in TABLE I can be drawn as thick-walled tubing of a precision nature. The draw was at a temperature over 150° C. below the liquidus temperature of the glass. Tubes and rods of this glass have also been drawn in a commercial draw tower to provide a high-strength fiber.

We claim:

1. A titania lanthana aluminosilicate glass having a strain point in excess of 780° C., a coefficient of thermal expansion (0–300° C.) of 20–60×10$^{-7}$/° C., a Young's modulus greater than 12 Mpsi, and a weight loss less than one mg/cm$^2$ in BHF wherein the titania can be partially or completely replaced by tantalum oxide.

2. The glass of claim 1 consisting essentially of, expressed in mol percent and calculated from the glass batch on an oxide basis, 40–90% $SiO_2$, 5–35% $Al_2O_3$, 2–30% $La_2O_3$, and 0.5–20% ($TiO_2+Ta_2O_5$).

3. The glass of claim 1 consisting essentially of, expressed and calculated from the glass batch on an oxide basis, 40–90% $SiO_2$, 5–35% $Al_2O_3$, 2–30% $La_2O_3$, 0.5–20% ($TiO_2+Ta_2O_5$), and 0–10% $ZrO_2$, $HfO_2$, $SnO_2$, $GeO_2$, and/or $Ga_2O_3$.

4. The glass of claim 1 consisting essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$), and 0–3% $Sb_2O_3$, $WO_3$, $B_2O_3$ and/or $P_2O_5$.

5. The glass of claim 1 consisting essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$), and 0–10% of one or more of the divalent metal oxide MgO, CaO, SrO, BaO and ZnO.

6. A lanthana aluminosilicate glass in accordance with claim 1 consisting essentially of, expressed in mol percent and calculated from the glass batch on an oxide basis, 70–84% $SiO_2$, 6–18% $Al_2O_3$, 2–15% $La_2O_3$, and 1–8% ($TiO_2+Ta_2O_5$).

7. The glass of claim 1 consisting essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$), and less than 3% of one or more of MgO, CaO, SrO, BaO, and/or ZnO.

8. The glass of claim 5 having a strain point in the range of 840–900° C. and a CTE in the range of 20–40×10$^{-7}$/° C.

9. An electronic device comprising a poly-silicon film on a transparent, glass substrate, the substrate being a titania lanthana aluminosilicate glass having a strain point in excess of 780° C., a coefficient of thermal expansion in the range of 20–60×10$^{-7}$/° C., a Young's modulus greater than 12 Mpsi and a weight loss not over one mg/cm$^2$ in BHF wherein the titania can be partially or completely replaced by tantalum oxide.

10. An electronic device in accordance with claim 9, wherein the substrate glass consists essentially of, expressed in mol percent and calculated from the glass batch on an oxide basis, 40–90% $SiO_2$, 5–35% $Al_2O_3$, 2–30% $La_2O_3$, and 0.5–20% ($TiO_2+Ta_2O_5$).

11. An electronic device in accordance with claim 9 wherein the substrate glass consists essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$), and 0–10% $ZrO_2$, $HfO_2$, $SnO_2$, $GeO_2$, and/or $Ga_2O_3$.

12. An electronic device in accordance with claim 9 wherein the substrate glass consists essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$) and 0–3% $Sb_2O_3$, $WO_3$, $B_2O_3$ and/or $P_2O_5$.

13. An electronic device in accordance with claim 9 wherein the substrate glass consists essentially of, expressed in mol percent and calculated from the glass batch on an oxide basis, 40–90% $SiO_2$, 5–35% $Al_2O_3$, 2–30% $La_2O_3$, 0.5–20% ($TiO_2+Ta_2O_5$) and 0–10% of one or more of the divalent metal oxides MgO, CaO, SrO, BaO and ZnO.

14. An electronic device in accordance with claim 9 wherein the glass substrate is a titania lanthana aluminosilicate glass consisting essentially of 70–84 mol % $SiO_2$, 6–18% $Al_2O_3$, 2–15% $La_2O_3$, and 1–8% ($TiO_2+Ta_2O_5$) and having a strain point in the range of 840–900° C. and a CTE in the range of 20–40×10$^{-7}$/° C. wherein the titania can be partially or completely replaced by tantalum oxide.

* * * * *

UNITED STATES PATENT AND TRADEMARK OFFICE
CERTIFICATE OF CORRECTION

PATENT NO. : 6,555,232 B1
DATED : April 29, 2003
INVENTOR(S) : Aitken, Bruce G. et al.

It is certified that error appears in the above-identified patent and that said Letters Patent is hereby corrected as shown below:

Column 5,
Line 46, add -- in mol percent -- after "expressed"

Signed and Sealed this

Second Day of March, 2004

JON W. DUDAS
*Acting Director of the United States Patent and Trademark Office*